United States Patent [19]

Orazi

[11] Patent Number: 4,577,815
[45] Date of Patent: Mar. 25, 1986

[54] WING ASSEMBLIES FOR AIRCRAFT

[76] Inventor: Paul Orazi, Box 32, Miami Beach, Fla. 33139

[21] Appl. No.: 407,550

[22] Filed: Aug. 12, 1982

Related U.S. Application Data

[63] Continuation-in-part of Ser. No. 97,342, Nov. 26, 1979, abandoned.

[51] Int. Cl.³ .............................................. B64C 3/00
[52] U.S. Cl. .................................. 244/39; 244/153 A
[58] Field of Search ...................... 244/10, 19, 21, 39, 244/123, 124, 219, 60, 153 A; 416/223, 226, 110, 132 R, 4; 193/37

[56] References Cited

U.S. PATENT DOCUMENTS

| | | | |
|---|---|---|---|
| 1,182,069 | 9/1931 | Stroop | 244/219 |
| 1,665,533 | 4/1928 | Dally | 244/21 |
| 1,865,582 | 6/1932 | Park | 416/110 |
| 2,039,676 | 5/1936 | Zaparka | 244/21 |
| 2,308,935 | 1/1943 | Scheler | 244/124 |
| 2,412,908 | 12/1946 | Platt et al. | 244/123 |
| 2,714,495 | 8/1955 | Focke | 244/10 |
| 2,814,350 | 11/1957 | Nelson | 416/226 |
| 3,105,557 | 10/1963 | Wigal | 244/123 |
| 3,306,680 | 2/1967 | Bruyere | 244/60 |
| 3,400,904 | 9/1968 | Bede | 244/124 |
| 3,424,651 | 1/1969 | Noyer et al. | 193/37 |
| 3,430,894 | 3/1969 | Strand et al. | 244/39 |
| 3,506,220 | 4/1970 | Sbrilli | 416/4 |
| 3,540,681 | 11/1970 | Orazi | 244/39 |
| 3,599,769 | 8/1971 | Gardella | 193/37 |
| 3,756,541 | 9/1973 | Orazi | 244/39 |

FOREIGN PATENT DOCUMENTS

| | | | |
|---|---|---|---|
| 30075 | 1/1926 | France | 416/132 |
| 0688392 | 12/1979 | U.S.S.R. | 193/37 |

Primary Examiner—Galen L. Barefoot

[57] ABSTRACT

A longitudinally extending flying surface in the form of a box-like structure, floats on and surrounds a frame including a spar, in the chordal plane. Two suitable links mounted at a spanwise distance between them, link the spar with the flying surface: they cooperate with themselves to form two fixed points of intercept with respect to the flying surface, of the curvature of flexion covered by the spar on the flying surface in the chordal plane: they permit the free flex of the spar relatively to the flying surface in the chordal plane, during the axial rotation of the spar. In a modified wing the spar and a plurality of non spherical bearings coaxial with the spar provide the framework, and the wing sheets forming flying surfaces are able to slide on such a framework: the assembly has no structure between the wing sheets and the bearings, and no contacting structure surrounding the circumference of the bearings, and maintains a space flanking the bearings in the chordal plane to allow the movement of the bearings according to the curvature of flexion of the spar, such that during rotation of the flying surface, the spar can freely flex for the whole of its span relatively to the flying surface in the chordal plane.

29 Claims, 12 Drawing Figures

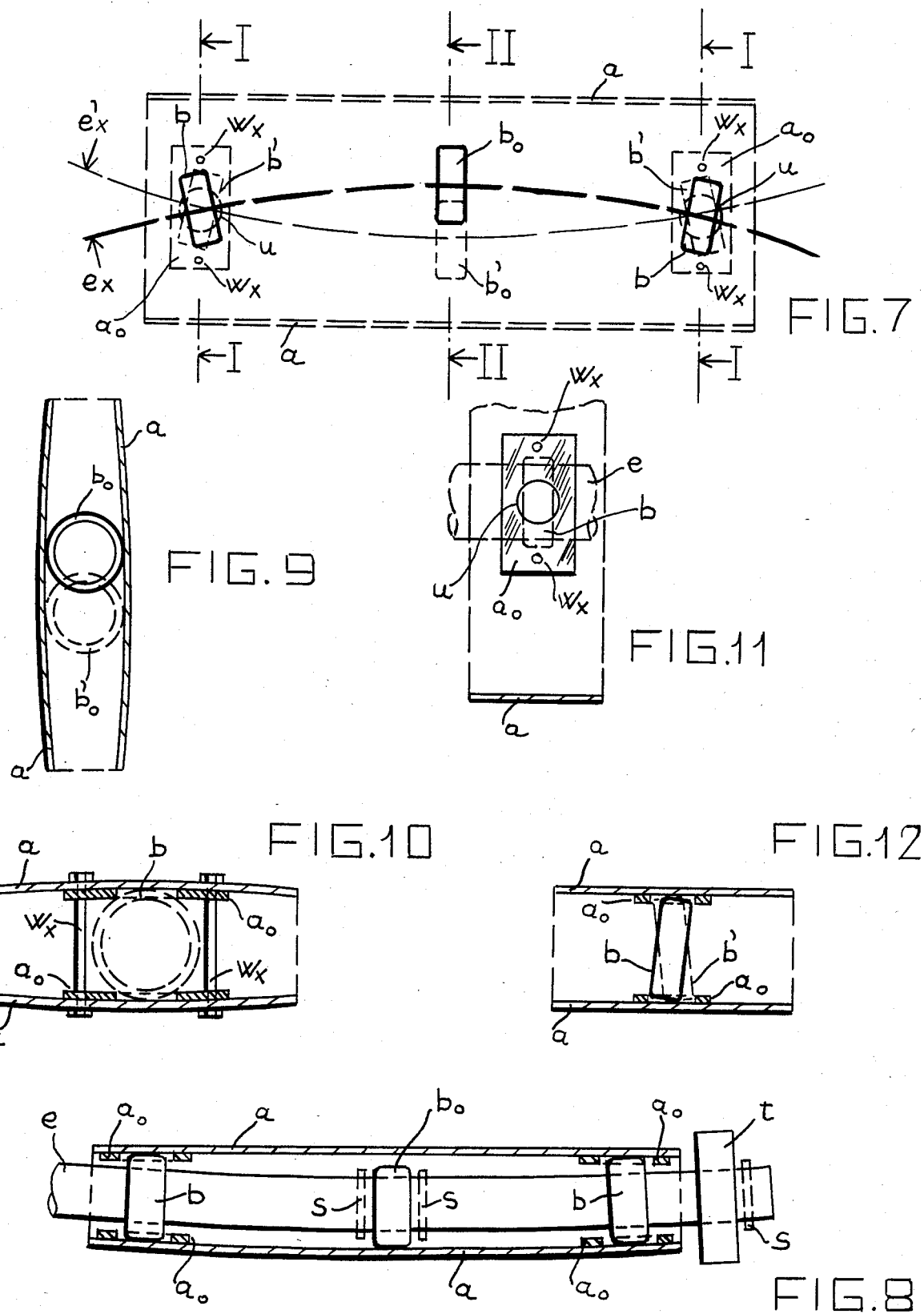

WING ASSEMBLIES FOR AIRCRAFT

This application is a continuation in part of Ser. No. 06/097,342 filed on 11/26/79 co-pending with Ser. No. 919,213 filed on 6/26/78 co-pending with Ser. No. 823,505 filed on 8/10/77 co-pending with Ser. No. 572,403 filed on 4/28/75 co-pending with Ser. No. 326,510 filed on 1/23/73, all now abandoned, co-pending with application Ser. No. 109,104, now U.S. Pat. No. 3,756,541.

BACKGROUND OF THE INVENTION

The present invention relates to an improvement or modification of the invention claimed in application 109,104, now U.S. Pat. No. 3,756,541, which describes a rotary wing assembly, whereby during rotation of the wing, the wing spar can flex in the plane of the wing without transmission of corresponding bending movement to the wing sheets.

By the terms "the plane of the wing" is meant a plane in which lie the wing sheets of the wing, namely the chordal plane. This meaning will be the same also in the present application, In the previous patent, for the functioning of the assembly, it is necessary that centrifugal force hurls the wing panels against the frame, and that the relative movement between the frame and the wing panels, be stopped by periodic collisions between these parts, during rotation, because the link means (to link the wing panels to the spar) are longitudinal slots in the wing sheets.

SUMMARY OF THE INVENTION

In the present invention the link means (to link the wing panel to the spar) are not longitudinal slots in the wing sheets: they prevent centrifugal force to hurl the wing panel against the frame, while the relative movement between these parts happens without collisions. According to the present invention, there is provided a rotary wing assembly for an aircraft, said assembly comprising a spar adapted to be mounted upon an aircraft fuselage, rotatably about the longitudinal axis of said spar and wing sheet forming flying surfaces and floating on and surrounding a frame including said spar, the spar being capable of limited movement relatively to said wing sheets, whereby during rotation of the wing the said spar can flex within the wing sheets without transmission of corresponding flexural movement to the wing sheets.

BRIEF DESCRIPTION OF THE INVENTION

The invention is illustrated, by way of example, in the accompanying drawings in which:

FIG. 1 is a side elevation of an embodiment of a wing according to the present invention, shown in rotary motion about its span axis, FIG. 2 is a cross-section of FIG. 1, FIG. 3 is a detail of FIG. 1, FIG. 4 is a complete cross-section of the wing of FIG. 1 along the line I—I of FIG. 3, FIG. 5 is a cross-section of a modified wing according to the present invention, and FIG. 6 is a side elevation of the wing of FIG. 5.

FIG. 7 is a plan view of a modified wing,

FIG. 8 is a side elevation of the modified wing of FIG. 7, shown in rotary motion about its spar.

FIG. 9 is a sectional elevation of the wing of FIG. 7 along the line II—II,

FIG. 10 is a cross-section of FIG. 7 Along the line I—I,

FIG. 11 is a plan view of a detail of FIG. 7 along the line I—I,

FIG. 12 is a side elevation of a detail of the wing of FIG. 7 as shown in FIG. 8.

DETAILED DESCRIPTION OF THE INVENTION

Figure 1:
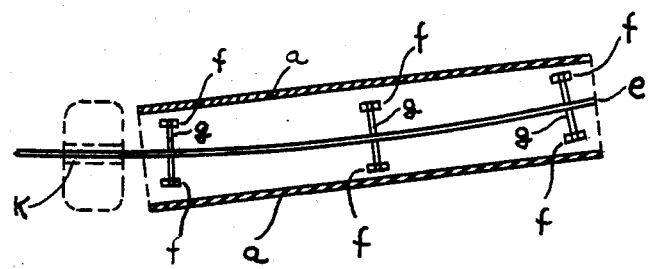
Figure 3:
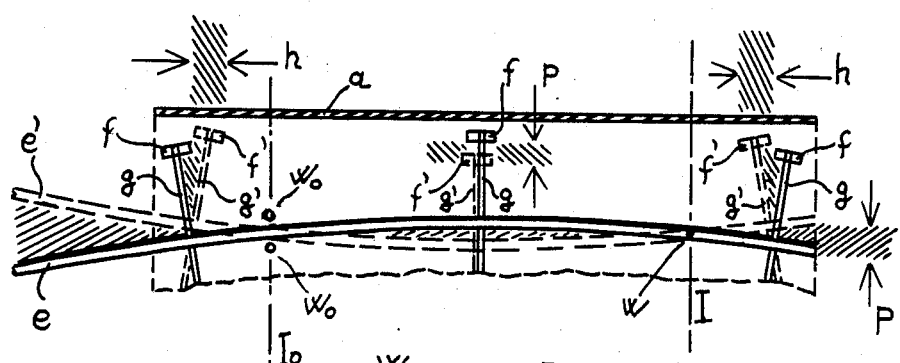

Referring to the drawings an aircraft fuselage carries a rotatable tubular spar e transversely mounted in bearings k (as shown in my previous U.S. Pat. No. 3756541, and U.S. Pats. Nos. 3477663 and 3540681) which spar e undergoes longitudinal flexion as shown in FIGS. 1 and 3 when in rotary motion. The spar e carries and passes through a plurality of transverse ribs g regularly disposed along the spar in one plane and extending symmetrically through the spar as shown in my U.S. Pat. No. 3540681 and each rib g is provided with broader end portions f. (for clarity only three ribs g are shown in the drawings; in practice many ribs would be provided in a wing).

Figure 2:
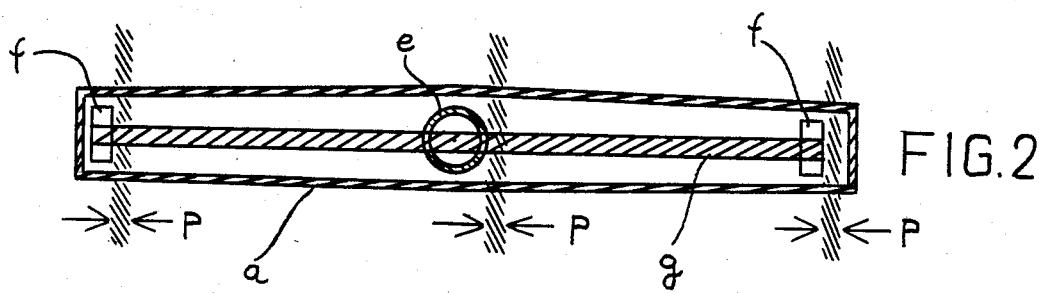
Figure 5:
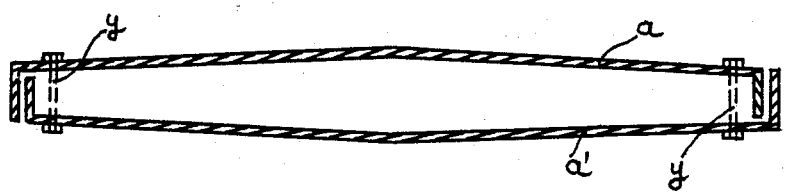

A longitudinally extending wing sheet a in the form of a pair of sheets linked together at their edges to form a box-like structure (as shown in the sections of FIGS. 2 or 5) is loosely carried by the enlarged portions f of the ribs g and surrounds the spar e and ribs g.

As can be seen from FIGS. 2 and 3, the wing sheet a is of such a size that it can accomodate longitudinal flexion of the spar e when in rotary motion.

As the spar e flexes because of rotation, between positions e and e' as shown in FIG. 3, the ribs g will move with both radial and arcuate movement p h between the positions g and g', and the broader ends f will move between positions f and f' while engaging the wing sheets.

As between positions e and e' the spar curvature will reverse relatively to the surface of the wing sheets, the curvatures as covered by the spar on the said surface, will intercept, FIG. 3, where two points of intercept can be seen.

In the previous patent the two points of intercept move spanwise relatively to the wing panel because of the spar flexion.

In the present application, two suitable links are fixed on the wing panel at a spanwise distance between them (to link the said wing panel to the spar): they cooperate with themselves to form two fixed points of intercept with respect to the surface of the wing panel, of the curvatures of flexion covered by the spar on the said surface in the plane of the wing.

To form the first fixed position of intercept a link is provided made of two bolts Wo, FIG. 3 assembled in correspondent holes provided in the wing panel a, such that the two bolts be perpendicular to the plane of the wing and connecting each surface of the wing sheet a, and be flanking oppositely the spar e with a sufficient clearance, such that the said bolts Wo be capable of spanwise movement relatively to the said spar towards port and conversely towards starboard every 90° of the phase of rotation.

The link is capable of spanwise movement relatively to the spar because: the mounting of the wing sheet on the spar does not make any contribution to the strength of the spar, thus the bending moment required to bend the spar to a curvature e is equal in all the angular directions of its cross-section. Thus during rotation the spar flexes to the same curvature in all the successive angular directions of its cross-section, therefore in one revolution it maintains the curvature e. The bending moment required to bend the wing sheet varies according to the angular directions of its cross-section (the sheet flexes in directions perpendicular to it cross-section, and does not flex in directions parallel to its cross-section). Thus during rotation the sheet flexes to different curvatures in all the successive angular directions of its cross-section, therefore in one revolution the sheet varies its curvature. Thus:

In 90° of rotation of the assembly, the sheet varies its curvature, from a curvature e equal to that of the spar (in directions perpendicular to the plane of the wing, the sheet follows the flexion of the spar), to a curvature zero (it straightens constituting a plane), while the spar maintains the curvature e.

The points of the sheet which corresponded to the points of the spar when the sheet and the spar were curving together to the same curvature e, will not correspond to the point of the spar when the sheet is straightened and the curvature of the spar is still e (except the points corresponding to the pivot W, mounted in a common point to the spar and to the sheet). This explains the spanwise travel of the bolts wo with respect to the spar. In the further 90° of rotation, the sheet curvature again follows the curvature e of the spar, and this inverts such spanwise travel of the bolts.

Figure 4:
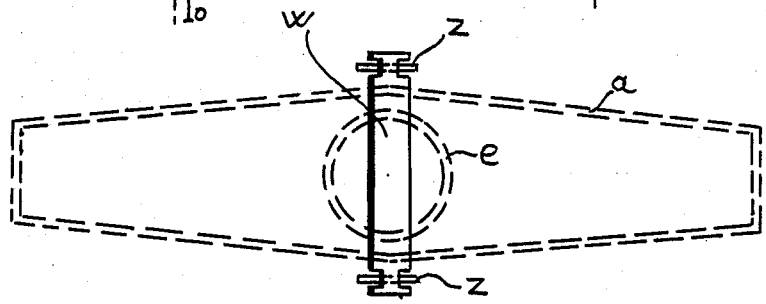

FIGS. 3, 4 show the construction of the second link: the wing sheet a is linked to the spar e by one pivot W (with snap rings z to keep it in position) passing through the spar e and forming the second fixed position of intercept with respect to the surface of the wing panel of the said curvatures of flexion and connected to each surface of the wing sheet a through correspondent holes, for free pivoting of the said wing sheet about the said pivot relatively to the spar in the plane of the wing; thus the spar flexion will cause the said wing sheets to pivot about the pivot W with respect to the spar, covering an angle represented by the angle of intercept of the curvatures of flexion e—e' at W, FIG. 3 every 90° of the phase of rotation.

Referring to FIG. 3, the wing panel is made of such a dimension, that the distance between the edge of the wing panel a and the bolt Wo on the axis Io, and the distance between the pivot W and the edge of the wing panel a on the axis I is such to keep the frame rib ends clear from the edges of the said wing sheet, even during the maximum flexion of the spar, and therefore during the whole phase of rotation of 360°: so that the movement p never reaches the edge of the wing sheet, as can be seen in FIG. 2. This prevents the wing sheet being stopped at its edges, by the rib ends being hurled against them, by centrifugal force.

The wing sheets are able to follow flexion of the said spar in directions other than in the plane of the wing. The wing sheets may comprise two opposed longitudinally extending sheet so linked as to allow of a limited increase in the flexibility thereof to accomodate flexion of the spar in directions other than in the plane of the wing.

Figure 6:
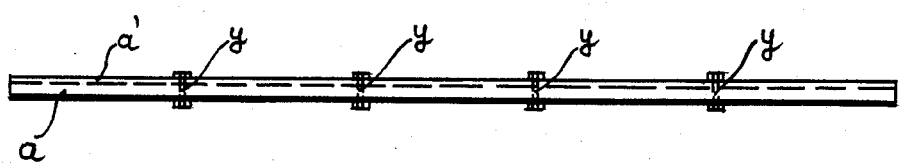

In FIGS. 5 and 6 there is shown a modified wing sheet for use in the assembly of the present invention, which wing sheet a is capable of accomodating flexion of the spar (not shown) in directions other than in the plane of the wing: and the spar is connected to the wing sheet in a manner similar to that described with reference to FIG. 4.

As may be seen from FIGS. 5 and 6, bolts y are provided connecting together two opposed and longitudinally extending wing sheets a and a' in such a fashion that the wing sheets a and a' are capable of a limited play with respect to each other.

The winged sheets a and a' each have their longitudinal edges angled relatively to the plane of the wing to form a hollow transverse section and are arranged tro oppose each other in overlapping relationship to constitute a box-shaped transverse section. In FIGS. 7, 8, 9 there is shown a modified wing comprising a spar extending spanwise and attached to the aircraft (not shown) and wing sheets rotatable about said spar, about the span axis, through a plurality of bearings mounted axially on the spar.

The wing sheets do not float on the spar, as previously illustrated, but upon the outer rings (outer races) of said bearings. The wing sheets are capable of limited spherical floating upon some of the bearings (which link the wing sheets to the spar), and of chordwise floating upon others (these bearings also help the wing sheets to rotate about the spar, but they move away from the center of the wing sheets chord, due to the spar flexion during rotation).

There is a requirement for the wing sheets to be disposed close to the spar with reference to the axis perpendicular to the chordal plane. (The spar mounts bearings of low radial cross-section and no inner race (inner ring): the rollers roll directly on the spar, and they can move spanwise on the spar while rotating). The assembly does not use bearing housings to mount the said two bearings and attach them to the wing sheets (this would greatly increase the outide diameter of said bearings; for the same reason the assembly does not use spherical bearings), but the wing sheets cooperate with the said two bearings to attain limited spherical floating of the wing sheets relatively to said two bearings, (thus two links are formed to link the wing sheets to the spar; the spar mounted within said bearings is thus allowed to flex relatively to the wing sheets, as the bearings are of a type capable of moving spanwise on the spar, because, as illustrated above, at least one of the two links must be able to move spanwise on the spar), in such a fashion that the wing sheets in their chordal plane are mounted tangent to the circumference of all bearings : the wing sheets then are separated from the spar only by a clearance corresponding to the cross-sectional thicknesss of the bearings (and thus the thickness of the box-shaped flying surface will not result greater than the bearings' outer diameter). Referring to the drawings, the wing sheets a may comprise flat rectangular flanges $a_o$ made of sheet and riveted to them (not shown) in a common plane at the center of the chord of the flying surface, and disposed to oppose each other with reference to the axis perpendicular to the chordal plane; the said flanges are provided with circular holes u also disposed to oppose each other along the said axis. The wing panel may carry, at the two points of intercept of the curvatures of flexion ex and ex' or the spar (not shown) relatively to the wing sheets, two set of such opposite flanges $a_o$ as can be seen from FIGS. 7 and 10, and each of the two mentioned sets will house one bearing. The holes u have a greater diameter than the width of the bearing b, as can be seen from FIGS. 7 and 11, and such that the bearing outer race, disposed with its radial cross-section perpendicular to the chordal plane, is mounted sunk within said opposite holes u so as to just penetrate the thickness of said opposite flanges, as seen in FIG. 10. The box-shaped wing sheet construction is such that the opposite surfaces a of FIG. 10 exert spring tension towards each other and retain the bearing b outer ring within the opposite holes u. Thus the bearing b is able to float within the circular holes u and upon the wing sheets a. (the bearing b is capable of limited spherical floating relatively to the wing sheets, as can be seen in FIGS. 7 and 12).

To secure the bearing b from slipping away from the circular holes u, bolts $w_x$ are provided, as can be seen in FIGS. 7, 10 and 11: each set of opposite flanges $a_o$ has correspondent holes drilled (to receive the bolts $w_x$) through the wing sheet a and the flanges $a_o$, and oppositely with reference to an axis perpendicular to the chordal plane.

As may be seen from FIGS. 7, 10 and 11 the distance between the bolts $w_x$ in plan view of the wing is greater than the diameter of the bearing b, to allow the bearing b to pivot about its axis perpendicular to the chordal plane.

Since both bearings b linking the wing panel to the spar, are able to move spanwise on the spar as to allow the spar flexion, the wing panel is able to move spanwise relatively to the spar, with reference to all points of the spar span.

Referring to FIG. 8, the spar e carries a thrust bearing t axially mounted on the spar e at the spar tip and secured by the snap-ring s, to stop the spanwise movement of the wing panel relative to the spar. To stop the spanwise movement of the wing sheets towards the spar root, a snap-ring (not shown) is mounted on the spar and flanking (at the root side of the spar) the bearing b which links the spar to the wing sheets.

As shown in FIG. 8, a clearance is left in the assembly, between the thrust bearing t and the wing panel tip, to accomodate the spanwise movement of the wing sheets and thus the spar flexion.

Other bearings (for clarity only one is shown in FIG. 8) may be mounted on the spar between the two said bearings; they are capable to float or to roll chordwise upon the wing sheet, during rotation of the said wing sheets and during the spar flexion.

FIG. 9 shows the positions $b_o$, $b'_o$ reached by the travel of the bearing $b_o$ positioned at the center of the spar e (not shown) of FIG. 7, relatively to the wing panel: the outer race of the bearing $b_o$ floats chordwise on the wing sheets.

Each wing sheet a may not bend equally in both opposite directions along the axis perpendicular to the chordal plane; so in rotary motion one wing sheet may bend less than the spar, as can be seen from FIG. 8, and result more detached from the spar e than the other wing sheet. The outer race of the bearing $b_o$ (positioned at the center of the spar e) then, being not oppositly engaged by both wing sheets, but by one only, may roll chordwise upon it.

Since the central bearing $b_o$ is also of a type able to move spanwise on the spar, and it is not linked to the wing sheets, the spar e carries snap-rings s which flank the said bearing and prevent it from moving spanwise on the spar.

Since the wing sheets move spanwise relatively to the spar as illustrated above, and the central bearing $b_o$ is prevented from moving spanwise on the spar, the wing sheets are then capable of moving spanwise relatively to the said bearing, besides being able to float chordwise on it.

What I claim is:

1. A rotary wing assembly for an aircraft, said assembly comprising a spar intended to be rotatably mounted upon an aircraft fuselage, and wing sheets forming flying surfaces and floating upon a frame including said spar, whereby during rotation of the wing assembly the said spar can flex without transmission of corresponding flexural movement to the wing sheets, the wing sheets cooperating with the frame to achieve the flexing of the spar while maintaining an internal clearance between said frame and said wing sheets.

2. A rotary wing assembly for an aircraft, said assembly comprising a spar intended to be rotatably mounted upon an aircraft fuselage, and wing sheets forming flying surfaces and mounted upon a frame including said spar, and link means to link the spar to the wing sheets, whereby said wing sheets can undergo limited movement relatively to said spar, whereby during rotation of the wing assembly the said spar can flex without transmission of corresponding bending movement to the wing sheets, the said link means maintaining an internal clearance between said frame and said wing sheets.

3. A rotary wing assembly for an aircraft, said assembly comprising a spar intended to be rotatably mounted upon an aircraft fuselage, and wing sheets forming flying surfaces and mounted upon a frame including said spar, the said wing sheets being capable of limited movement relatively to said spar, whereby during rotation of the wing assembly the said spar can flex without transmission of corresponding flexural movement to the wing sheets, the spar being linked to the wing sheets by means of one pivot perpendicular to the chordal plane of the wing assembly.

4. An assembly according to claim 3, whereby the said wing sheets can pivot about the said pivot relatively to the said spar in the chordal plane of the wing assembly to permit the said spar to flex relatively to said wing sheets.

5. An assembly according to claim 3, the said flying surface being linked to the said spar by the said pivot at one point of the span of the said flying surface, wherein with reference to the said flying surface the spar reverses its curvature every 180° or rotation such that two opposite curves are covered by the said spar on the said flying surface in the chordal plane of the wing assembly, which curves intercept at the said point.

6. A rotary wing assembly for an aircraft, said assembly comprising a spar intended to be rotatably mounted upon an aircraft fuselage, and wing sheets forming flying surfaces and mounted upon a frame including said spar, and link means whereby the said wing sheets can undergo limited movement relatively to said spar, whereby during rotation of the wing assembly the said spar can flex without transmission of corresponding bending movement to the wing sheets, wherein the link means link the spar to the wing sheets and have one link capable of spanwise movement with respect to the said spar.

7. A rotary wing assembly for an aircraft, said assembly comprising a spar adapted to be rotatably mounted upon an aircraft fuselage, and wing sheets forming a flying surface and mounted upon a frame including said spar, the said wing sheets being capable of limited movement relatively to said spar, whereby during rotation of the wing assembly the said spar can flex without transmission of corresponding flexural movement to the wing sheets, the said flying surface being of such a size relatively to the said frame, to form a clearance to space the said flying surface from the said frame in the chordal plane of the wing assembly while the spar has reached its maximum flexion.

8. An assembly according to claim 7, whereby the said relative movement between the frame and the flying surface is not stopped by the said flying surface being heuled against the frame.

9. A rotary wing assembly for an aircraft, said assembly comprising a spar adapted to be rotatably mounted upon an aircraft fuselage, and wing sheets including longitudinal edges forming a flying surface and mounted upon a frame including said spar, and link means to link the spar to the wing sheets, said wing sheets being capable of limited movement relatively to said spar, whereby during rotation of the wing assembly the said spar can flex without transmission of corresponding flexural movement to the wing sheets, wherein said link means comprise two link means which cooperate with themselves and with the chordal dimension of the said flying surface to provide a clearance between the frame and the wing sheets edges during the whole phase of rotation of 360°.

10. A rotary wing assembly for an aircraft, said assembly comprising a spar adapted to be rotatably mounted upon an aircraft fuselage, and wing sheets forming flying surfaces and floating upon a frame including said spar, whereby during rotation of the wing assembly the said spar can flex without transmission of corresponding flexural movement to the wing sheets, whereby the wing sheets are a pair of opposed longitudinally extending sheets so linked as to allow of a limited movement of the sheets towards or away from each other, thereby to accommodate flexion of the spar in directions other than in the chordal plane of the wing assembly.

11. A rotary wing assembly for an aircraft, said assembly comprising a spar adapted to be rotatably mounted upon an aircraft fuselage, and wing sheets forming a flying surface and floating upon a frame including said spar, whereby during rotation of the wing assembly the said spar can flex without transmission of corresponding flexural movement to the wing sheets, the said flying surface being linked to the said spar by two link means at two points of the span of the said flying surface, wherein with reference to the said flying surface of the spar reverses its curvature every 180° of rotation such that two opposite curves are covered by the said spar on the said flying surface in the chordal plane of the wing assembly, which curves intercept at the said two points.

12. A rotary wing assembly for an aircraft, said assembly comprising a spar adapted to be rotatably mounted upon an aircraft fuselage, and wing sheets forming flying surfaces and mounted upon a frame including said spar, and link means to link the spar to the wing sheets, whereby said wing sheets can undergo limited movement relatively to said spar, whereby during rotation of the wing assembly the said spar can flex without transmission of corresponding flexural movement to the wing sheets, the said link means being adapted for the wing assembly wherein the spar and the wing sheets do not rotate relatively to each other, whereby the said link means do not operate through longitudinal slots in the wing sheets.

13. A rotary wing assembly for an aircraft, said assembly comprising a spar adapted to be mounted upon an aircraft fuselage, the spar being the supporting spar of the wing assembly, wherein the said spar includes bearings axially mounted for rotation about said spar, and wing sheets forming flying surfaces and lying directly upon said bearings for continuous 360° rotation about said spar, the said bearings having no inner rings, wherein the said bearings maintain their axis of rotation fixed relatively to the said spar, the said wing sheets cooperating with the said bearings to attain floating of the wing sheets relatively to the outer surface of said bearings, whereby during rotation of the wing sheets the said spar can flex while moving the axis of rotation of the said bearings relatively to the wing sheets without transmission of corresponding flexural movement to the wing sheets.

14. A rotary wing assembly for an aircraft, said assembly comprising a spar adapted to be mounted upon an aircraft fuselage, and wing sheets forming flying surfaces and mounted upon a frame including said spar, and bearings axially mounted for rotation about said spar, the spar being the supporting structure of the wing assembly, the wing sheets being mounted upon said bearings for continuous 360° rotation about said spar, the said bearings maintaining their axis of rotation coaxial with the said spar, wherein the flexion of the said spar can move the said bearings relatively to the wing sheets, wherein the wing assembly has no structure between the surface of the wing sheets and the bearings, whereby the said wing sheets can float relatively to the outer circumference of the said bearings, whereby during rotation of the wing sheets the said spar can flex without transmission of corresponding flexural movement to the wing sheets, the wing sheets cooperating with the said frame to form a continuous longitudinal space between the said frame and the said wing sheets.

15. A rotary wing assembly for an aircraft, said assembly comprising a spar adapted to be mounted upon an aircraft fuselage, the spar being the supporting structure of the wing assembly, wherein the said spar includes bearings axially mounted for rotation about said spar, and wing sheets forming flying surfaces and lying directly upon the outer circumference of said bearings for continuous 360° rotation about said spar, the said bearings maintaining their axis of rotation coaxial with the said spar, wherein the wing sheets can slide on the outer surface of said bearings, whereby during rotation of the wing sheets the said spar can flex while moving the said bearings relatively to the wing sheets without transmission of corresponding flexural movement to the wing sheets, wherein the wing assembly has no contacting structure surrounding the circumference of said bearings.

16. A rotary wing assembly for an aircraft, said assembly comprising a spar adapted to be mounted upon an aircraft fuselage, the spar being the supporting structure of the wing assembly, wherein the said spar includes bearings axially mounted for rotation about said spar, and wing sheets forming flying surfaces and resting directly upon the outer circumference of said bearings for continuous 360° rotation about said spar, the said bearings maintaining their axis of rotation coaxial with the said spar, wherein the said wing sheets can float relatively to the outer surface of said bearings, whereby during rotation of the wing sheets the said spar can flex while moving the said bearings relatively to the wing sheets without transmission of corresponding flexural movement to the wing sheets, wherein the said bearings are not fixed to the wing sheets along a common axis relatively to the wing sheets, wherein the said spar can include more than two of said bearings.

17. A rotary wing assembly for an aircraft, said assembly comprising a spar adapted to be mounted upon an aircraft fuselage, the spar being the supporting structure of the wing assembly, wherein the said spar includes bearings axially mounted for rotation about said spar, and wing sheets forming flying surfaces and mounted upon said bearings for continuous 360° rotation about said spar, wherein the said wing sheets can float upon said bearings, whereby during rotation of the wing sheets the said spar can flex without transmission of corresponding flexural movement to the wing sheets, the wing sheets being capable of said rotation about said spar through said bearings while the flexion of the said spar can move chordwise at least one of the said bearings away from the span axis of the wing sheets such that the outer surface of said bearing can slide chordwise on said wing sheets.

18. A rotary wing assembly for an aircraft, said assembly comprising a spar adapted to be mounted upon an aircraft fuselage, the spar being the supporting structure of the wing assembly, wherein the said spar includes bearings axially mounted for rotation about said spar, and wing sheets forming flying surfaces and mounted upon said bearings for continuous 360° rotation about said spar, the said wing sheets being floating upon said bearings, whereby during rotation of the wing sheets the said spar can flex without transmission of corresponding flexural movement to the wing sheets, the wing sheets being capable of the said rotation about said spar through said bearings, while at least one of the said bearings is not attached to the wing sheets for the whole circumference of said bearing.

19. A rotary wing assembly for an aircraft, said assembly comprising a spar adapted to be mounted upon a aircraft fuselage, the spar being the supporting spar of the wing assembly, wherein the said spar includes bearings axially mounted for rotation about said spar, and wing sheets forming flying surfaces and mounted upon said bearings for continuous 360° rotation about said spar, the said bearings maintained their axis of rotation coaxial with the said spar, wherein the wing sheets can float relatively to the outer surface of said bearings, whereby during rotation of the wing sheets the said spar can flex while moving the said bearings relatively to the wing sheets without transmission of corresponding flexural movement to the wing sheets, wherein the wing sheets engage the said bearings only generally tangent with the circumference of the said bearings in the chordal plane of the wing assembly to allow space for the said spar to flex in the said plane relatively to the wing sheets and to accomodate the movement of the said bearings.

20. A rotary wing assembly for an aircraft, said assembly comprising a spar adapted to be mounted upon an aircraft fuselage, the spar being the supporting structure of the wing assembly, wherein the said spar includes bearings axially mounted for rotation about said spar, and wing sheets forming flying surfaces and resting directly upon the circumference of said bearings for continuous 360° rotation about said spar, the said bearings maintaining their axis of rotation fixed relatively to said spar, and link means to link the said bearings to said wing sheets such that the wing sheets can slide on the outer surface of said bearings, whereby during rotation of the wing sheets the said spar can flex while moving the said bearings relatively to the wing sheets without transmission of corresponding flexural movement to the wing sheets.

21. An assembly according to claims 2, 3, 6, 9, 12 or 20, wherein said link means are positioned at points of the span of the said flying surface which produce a relative movement between said frame and said wing sheets such that the said relative movement is suitable for the said rotation.

22. A rotary wing assembly for a aircraft, said assembly comprising a spar adapted to be mounted upon an aircraft fuselage, the spar being the supporting structure of the wing assembly, wherein the said spar includes bearings axially mounted for rotation about said spar, and wing sheets forming flying surfaces and resting directly upon the outer surface of said bearings for continuous 360° rotation about said spar, the said bearings maintaining their axis of rotation coaxial with said spar, wherein the wing sheets can float relatively to the external circumference of the said bearings, whereby during rotation of the wing sheets the said spar can flex while moving the said bearings relatively to the wing sheet without transmission of corresponding flexural movement to the wing sheets, wherein the wing sheets cooperate with a fixed distance maintained between said wing sheets perpendicularly to the chordal plane of the wing assembly to retain the said bearings in a fashion adapt for the said rotation, wherein the said wing sheets are not hurled chordwise off said spar.

23. A rotary wing assembly for an aircraft, said assembly comprising a spar adapted to be mounted upon an aircraft fuselage, the spar being the supporting spar of the wing assembly, wherein the said spar includes bearings axially mounted on said spar, and wing sheets forming flying surfaces and resting directly upon said bearings for continuous 360° rotation about said spar, the said bearings being not spherical, wherein the flexion of the said spar moves the axis of rotation of the said bearings relatively to the wing sheets, wherein the wing sheets can float relatively to the outer surface of said bearings, wherein the surfaces of the wing sheets function as aligning means, whereby during rotation of the wing sheets the said spar can flex while moving the said bearings relatively to the wing sheets without transmission of corresponding flexural movement to the wing sheets, wherein the wing sheets do not have sperical aligning means.

24. A rotary wing assembly for an aircraft, said assembly comprising a spar adapted to be mounted upon an aircraft fuselage, the spar being the supporting structures of the wing assembly, wherein the said spar includes bearings axially mounted for rotation about said spar, and wing sheets forming flying surfaces and resting directly upon said bearings for continuous 360° rotation about said spar, the said bearings maintaining their axis of rotation fixed relatively to the said spar, wherein the flexion of the said moves the axis of rotation of the said bearings relatively to the wing sheets, wherein the wing sheets can float relatively to the outer surface of said bearings, whereby during rotation of the wing sheets the said spar can flex while moving the said bearings relatively to the wing sheets without transmission of corresponding flexural movement to the wing sheets, wherein the wing assembly maintains a space flanking the said bearings in the chordal plane of the wing sheets to allow the said movement of the said bearings according to the curve of flexion of said spar such that the said spar can freely flex for the whole of its span while carrying more than two of said bearings.

25. A rotary wing assembly for an aircraft, said assembly comprising a spar adapted to be mounted upon an aircraft fuselage, the spar being the supporting spar of the wing assembly, wherein the said spar includes bearings axially mounted for rotation about said spar, and wing sheets forming flying surfaces and resting directly upon the outer circumference of said bearings for continuous 360° rotation about said spar, wherein the wing sheets can float relatively to the outer circumference of said bearings, wherein the wing sheets engage the bearings such that self alignment is attained between the said wing sheets and the said spar, whereby during rotation of the wing sheets the said spar can flex without transmission of corresponding flexural movement to the wing sheets, wherein the said alignment is not attained between the bearings' parts but solely between the surface of the wing sheets and the bearings.

26. A rotary wing assembly for an aircraft according to claims 1, 2, 3, 6, 7, 9, 13, 14, 15, 16, 17, 18, 19, 20, 22, 24 or 25, wherein the wing sheets are a pair of opposed longitudinally extending sheets, and each sheet has its longitudal edges angled relatively to the chordal plane of the wing assembly to form a shallow transverse section and the sheets oppose each other in an overlapping relationship to constitute a wing sheet of generally box-shaped transverse section.

27. An assembly according to any one of claims 13, 14, 15, 16, 17, 18, 19, 20, 22, 23, 25, wherein the wing sheets are capable to move spanwise relatively to the said spar, wherein the spar carries at least one thrust bearing axially mounted on the said spar to stop the spanwise movement of the wing sheets.

28. An assembly according to any of claims 13, 14, 15, 16, 17, 18, 19, 20, 22, 23, 25, wherein the wing sheets form an airfoil section, and the said wing sheets are cleared from the said spar of a dimension generally equal to the cross-section thickness of said bearings.

29. An assembly according to any of claims 13, 14, 15, 16, 17, 18, 19, 20, 22, 23, 25, wherein the said wing sheets comprise opposite circular holes, wherein the said bearings are mounted partially sunk in said opposite circular holes and capable of floating within said circular holes relatively to the wing sheets.

* * * * *